United States Patent [19]
Stewart

[11] Patent Number: 5,265,525
[45] Date of Patent: Nov. 30, 1993

[54] AUTOMATIC BREADER/SIFTER UNIT

[76] Inventor: Frank Stewart, 20 Catherine Pl., Latham, N.Y. 12110

[21] Appl. No.: 44,414

[22] Filed: Apr. 8, 1993

Related U.S. Application Data

[63] Continuation-in-part of Ser. No. 6,047, Jan. 19, 1993, Pat. No. 5,226,354.

[51] Int. Cl.⁵ .................... A23L 1/31; A23G 3/26
[52] U.S. Cl. ......................... 99/494; 99/535; 118/16; 118/19; 118/23; 118/418; 366/232; 366/234
[58] Field of Search .......... 99/494, 348, 516, 534–536; 118/16, 19, 23, 24, 312, 417, 418; 366/232, 234; 209/288

[56] References Cited

U.S. PATENT DOCUMENTS

| | | | |
|---|---|---|---|
| 2,897,776 | 8/1959 | Black et al. | 118/24 |
| 3,097,967 | 7/1963 | Fries et al. | 118/19 |
| 3,136,660 | 6/1964 | Mueller . | |
| 3,152,010 | 10/1964 | Case | 118/24 |
| 3,225,735 | 12/1965 | Arcabasso | 99/494 |
| 3,469,561 | 9/1969 | Gordon | 118/19 |
| 3,611,984 | 10/1971 | Angold | 118/19 |
| 3,709,193 | 1/1973 | Moore | 366/234 X |
| 3,739,743 | 6/1973 | McKee, Jr. | 118/19 |
| 3,855,965 | 12/1974 | Gordon | 118/16 |
| 4,458,586 | 7/1984 | Reed | 99/494 |
| 5,020,427 | 6/1991 | Kennefick et al. . | |
| 5,052,330 | 10/1991 | Stacy | 99/494 |

FOREIGN PATENT DOCUMENTS 2579420  10/1986  France ................ 99/494

*Primary Examiner*—Timothy F. Simone
*Attorney, Agent, or Firm*—Schmeiser, Morelle & Watts

[57] ABSTRACT

The invention is an automatic breader/sifter unit used to facilitate the application of a breading material to a food product. The unit includes a rotatable, horizontally-oriented drum that has an octagonal shape. The sidewalls of the drum include a large number of apertures so that when breading material is within the drum, the material contacts the drum and is sifted as the drum rotates. The drum is motor-driven and is at least partially surrounded by an exterior housing. The housing prevents the sifted breading material from escaping from the unit.

19 Claims, 4 Drawing Sheets

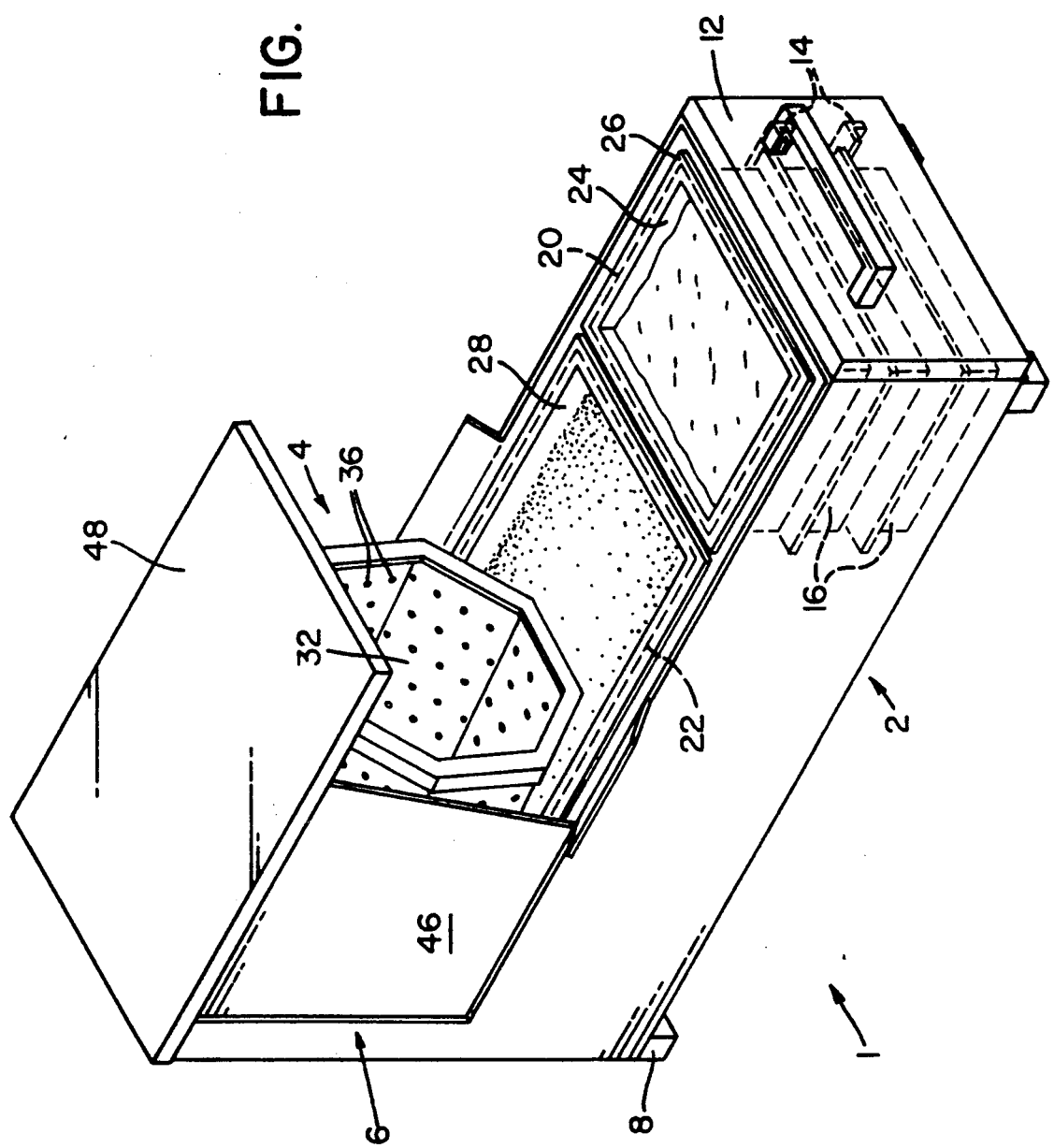

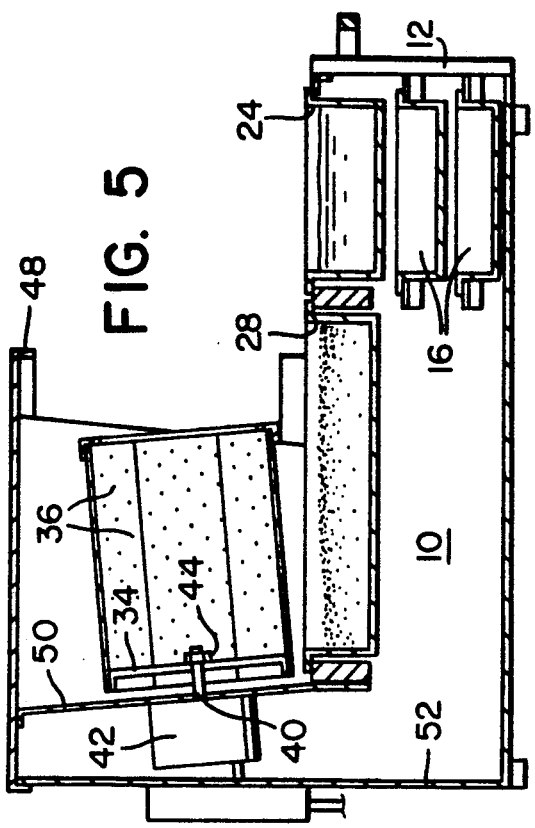
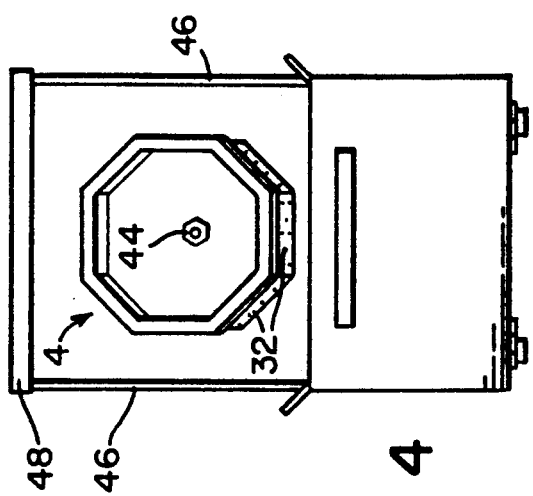
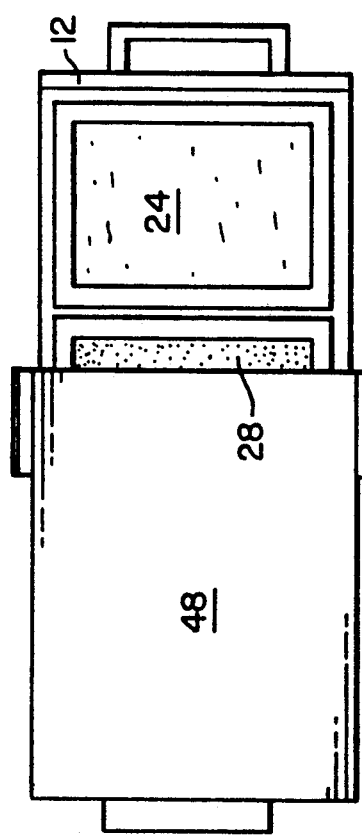
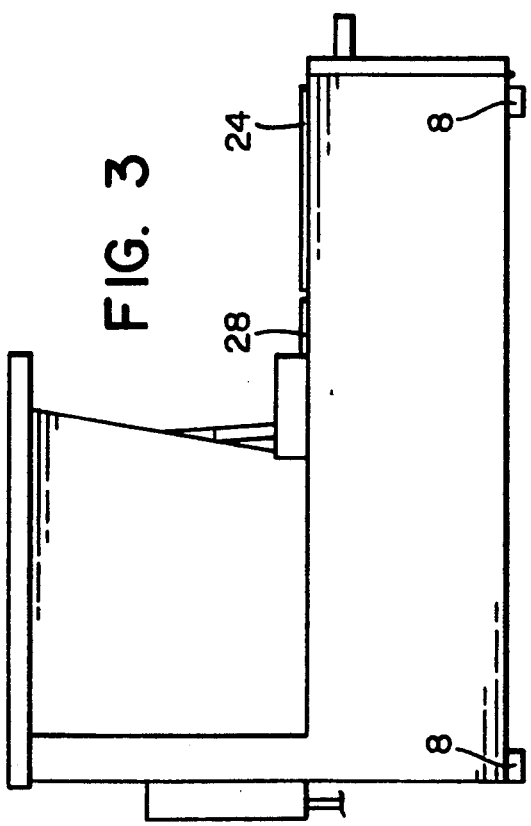

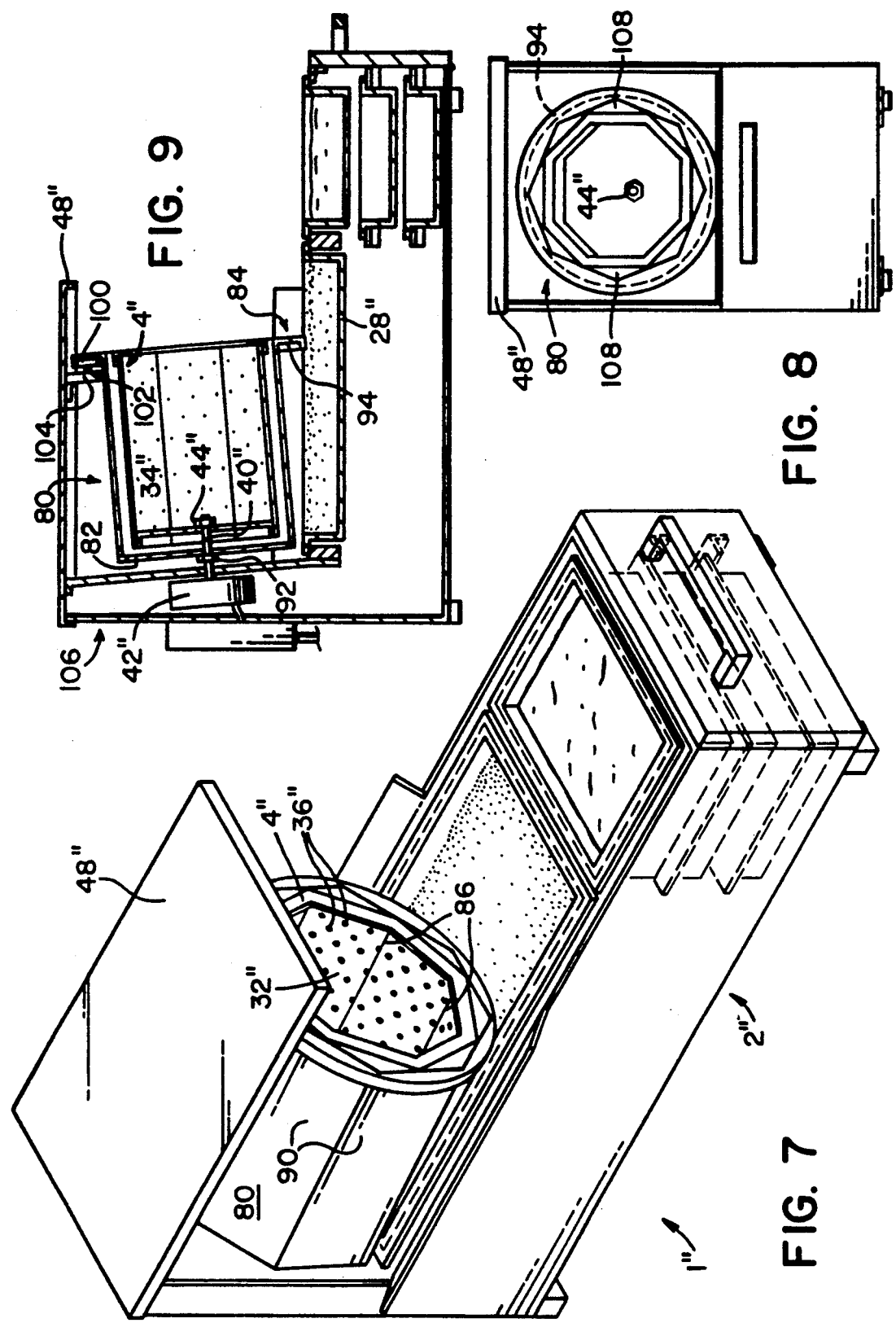

AUTOMATIC BREADER/SIFTER UNIT

This is a Continuation-In-Part of application Ser. No.: 08/006,047, dated Jan. 19, 1993, now U.S. Pat. No. 5,226,354.

FIELD OF THE INVENTION

The invention is in the field of food preparation equipment. More particularly, the invention is a unit for applying an outer breading layer to a meat or vegetable product. The unit makes use of a rotatable drum to apply an even coating of breading material to the food product while at the same time causing a sifting of the breading material.

BACKGROUND OF THE INVENTION

There are a number of steps involved in order to place a breading layer on a meat or vegetable product. The base food product, for example a piece of chicken or a mushroom, is initially washed. Optionally, a fine layer of flour may then be applied to the product. Next, the food product is dipped into a liquid batter wash to coat its exterior with batter. The batter-coated food product is then placed into contact with a breading material such as bread crumbs or flour. Following this, the food product is manipulated in the breading until an even layer of breading coats the exterior of the product. The food product is then ready to be cooked in the desired manner.

The above basic procedure is followed whenever large or small quantities of foods are to be breaded. However, the commercial preparer must be able to bread large quantities of the food product in a relatively small amount of time and with maximum efficiency. Therefore, for the commercial preparer such as a restaurant or a high-volume food processing plant, a number of devices have been patented to facilitate the breading process.

Arcabasso (U.S. Pat. No. 3,225,735) teaches a breading unit that employs a rotatable drum for applying the breading to the food product. A quantity of breading material is initially placed into the drum via a hinged door. Next, the batter-coated food product is placed within the drum and the drum is then rotated to cause the breading to contact the food product. The drum includes a plurality of radially-located agitators/bumpers that help to remove excess breading from the food product.

Reed (U.S. Pat. No. 4,458,586) shows another type of breading unit that also employs a drum. In the Reed unit, once the batter-coated food product and breading material are placed within the drum, radially-located agitator bars are moved in a circular path within the drum. This causes the food product and breading material to be agitated, with the result that the breading coats the exterior of the food product.

Kennefick et al (U.S. Pat. No. 5,020,427) teaches a breading apparatus that employs a movable sifter basket that is used to transport the food product to a number of different stations along a table. The sifter basket can also be used to remove excess flour from the breaded food product by manually oscillating the basket on its pivotal mount.

There are a number of problems that are encountered when a food product is to be breaded. The above noted prior art patents address some of these problems with varying degrees of success.

Firstly, a large number of separate, time-consuming steps are required for the breading process. This makes the process labor intensive and therefore expensive for the commercial preparer.

Another problem is that it is extremely difficult to achieve an even layer of breading on the surface of the food product. There will often be areas on the food product that are not coated with breading and other areas in which the breading layer is too thick. This results in wastage of the breading and an unappealing look to the finished product.

A third problem is that the breading material and/or flour tends to clump together. To alleviate this problem, the breading and/or flour material must be repeatedly sifted in order to evenly distribute the particles, break up clumps of particles, and to achieve a uniform density of the material. However, sifting of the breading and/or flour material is a time-consuming process and usually requires the use of sifter in a dedicated space.

A fourth problem occurs during the breading process. Some batter will normally mix with the breading material and cause the formation of extremely large clumps of the breading material. These large clumps of breading, called doughballs, must be separated from the rest of the breading material and also from the breaded food product. This is normally accomplished either by hand or with a grid-type separator. Once removed, the doughballs are usually discarded.

An additional problem is that when a user wishes to change either the breading material or the food product to be breaded, an extensive and time-consuming cleaning of the apparatus is required. Different trays must be removed and transported to or from remote storage locations. If a drum or other breading apparatus is used, a time-consuming disassembly is required in order to properly clean the unit.

Lastly, when a breading machine is used, it is sometimes difficult to remove the breaded food product from the unit. As a result, the food product can become torn as it is removed from the unit, or portions of the breading material can be inadvertently scraped from the exterior of the food product.

SUMMARY OF THE INVENTION

The invention is a breader/sifter unit that is compact in design and is used to facilitate the breading of food products. The unit employs a cabinet that includes a breading material tray and a batter (egg-based wash) tray inset into its upper surface. The cabinet preferably has an interior storage area for holding trays of additional or different breading materials, batters or food products. Optionally, portions of the cabinet can be insulated, refrigerated or heated, depending on the user's needs.

A rotatable drum is situated above the cabinet's top-located breading material tray. When a batter-coated food product and a quantity of breading material are within the drum, rotation of the drum causes the breading material to uniformly coat the food product. In addition, the drum includes an integral sifter structure that sifts the contained breading material whenever the drum is rotated.

The drum's center axis is substantially horizontally-oriented. The axis is either fully horizontal or is slightly angled from the horizontal with the front end of the drum tipped upwards. This orientation enhances the breading process and allows ready access to the drum's interior through the open front end of the drum.

The drum is octagonally-shaped with each of its eight sides having a plurality of small apertures. The apertures enable the drum to perform a sifting operation when breading material is contained within the drum.

In first and second embodiments of the invention, a housing surrounds the top, rear and sides of the drum. The housing also functions to support the drum and includes an electric motor that is connected to the drum by a shaft. Since the drum is substantially surrounded by the housing and is located above the breading tray, particles that pass through the apertures in the drum's sidewalls drop into the tray.

In an alternate embodiment, the housing is also drum-shaped and fully surrounds the rotatable drum. The housing is secured to the drum and rotates with it. In this embodiment, the sifted material does not directly fall back into the breading storage tray. Instead, the breading material is sifted as it passes through the apertures in the inner drum and is then captured between the inner drum and the outer drum-shaped housing. As the combined drum and housing rotate, gravity causes some of the sifted breading material to fall back through the apertures and reenter the inner drum where it is applied to the food product.

In the above described alternate embodiment, the housing is either round or octagonal in shape so that it is complementary to the inner drum. When an octagonal housing is used with an octagonal inner drum, it is preferred that the housing be offset from the drum so that the edges between adjacent sides of the drum are located proximate the center of each of the housing's sides.

Also in the above described alternate embodiment, it is desirable to employ both front and rear support structure for the housing and drum due to their combined weight. The preferred method for achieving the front support is to add a channel to the front end of the housing with the channel adapted to receive a support roller. The roller is anchored to a base-attached support member that is located either above or below the housing. The rear support is provided by a vertically-oriented support member that is attached to the base proximate the rear of the unit. The rear support member contains the motor, the shaft of which extends through and supports the rear surfaces of both the housing and the drum.

The time and labor required to bread a food product are minimized by combining the sifting and breading stages of the breading process. The substantially horizontally-oriented octagonal drum enables an even layering of breading onto the food product and allows easy access to the interior of the drum for the entering or removal of the food product and breading. The agitation of the food product in combination with the design of the drum also causes a comminution of any dough-balls that form. The uncomplicated nature of the unit provides easy accessibility to its components so that the unit is easy to clean and changing of the food product and/or breading material is simple and fast.

BRIEF DESCRIPTION OF THE DRAWINGS

FIG. 1 is a perspective view of a breader/sifter unit in accordance with the invention.

FIG. 2 is a top view of the unit shown in FIG. 1.

FIG. 3 is a side view of the unit shown in FIG. 1.

FIG. 4 is a front view of the unit shown in FIG. 1.

FIG. 5 is a side cross-sectional view of the unit shown in FIG. 1.

FIG. 7 is a perspective view of a third embodiment of a breader/sifter unit in accordance with the invention.

FIG. 8 is a front view of the unit shown in FIG. 7.

FIG. 9 is a side cross-sectional view of the unit shown in FIG. 7.

DETAILED DESCRIPTION OF THE DRAWINGS

Figure 6:
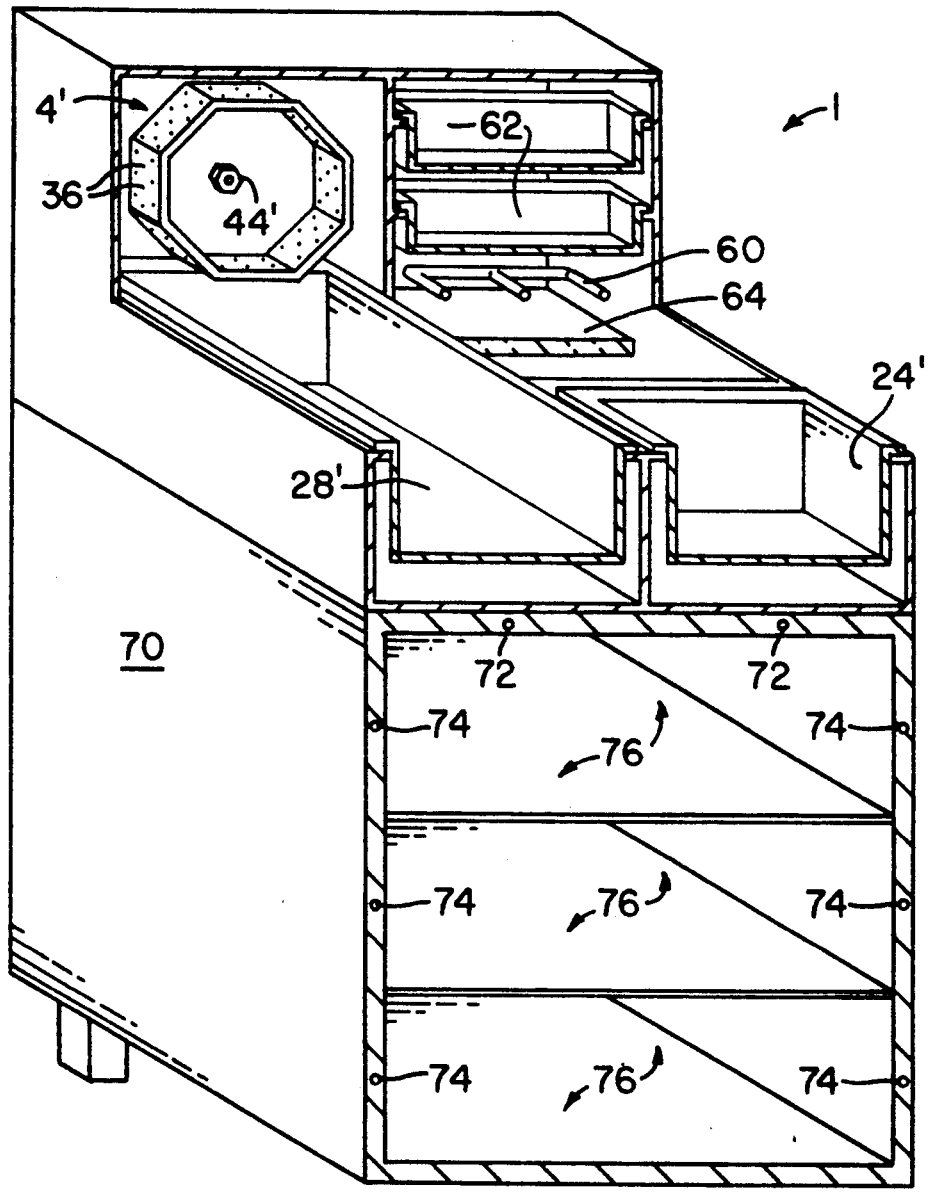
FIG. 6 is a perspective view of a second embodiment of a breader/sifter unit in accordance with the invention with the front portion of the unit removed for clarity.

Referring now to the drawings in greater detail, wherein like reference characters refer to like parts throughout the several figures, there is shown in FIGS. 1-5 an automatic breader/sifter unit 1 in accordance with the invention.

The unit comprises a cabinet-type base 2 and an octagonally-shaped drum 4. The drum is located within a housing 6 that surrounds the sides, rear and top of the drum.

The base 2 is preferably rectangular in shape and is supported by either a plurality of legs 8 or is placed upon a separate cart or cabinet. The base has an interior area 10 that is accessible via a hingedly-attached door 12. The interior area includes shelf structures 14 that are used to support a plurality of trays 16.

The top of the base has a front recess 20 and a rear recess 22. The front recess 20 is sized to inwardly receive a batter/egg-based wash tray 24. The tray has an outer lip 26 that engages the top of the base along the edge of the recess to thereby provide support for the tray. The rear recess 22 is designed to inwardly receive an elongated breading tray 28. The breading tray fits within recess 22 and is supported at its edges by the area around the recess in the same manner as used for tray 24.

Drum 4 is preferably located above the base and has eight sides 32 and a rear face 34. The front of the drum is open to provide easy access to the drum's interior. The sides of the drum each have a plurality of closely-spaced apertures 36 to allow the drum to perform a sifting action when breading material is contained within the drum. The apertures are preferably one-eighth inch in diameter. Smaller diameter apertures, for example seven-sixty-fourths or three-thirty-seconds of an inch, are too easily clogged by the breading. Larger diameter apertures, nine-sixty-fourths or five-thirty-seconds of an inch for example, allow too much breading to pass through and result in an uneven breading of the food product.

The drum 4 is rotatably supported by a shaft 40 that extends outwardly from a motor 42 that is secured to the housing 6. A fastener 44 is removably engaged to the shaft and contacts the drum's rear face 34. The fastener 44 is designed to be easily removed from the shaft to enable the drum to be quickly disengaged from the shaft and removed for cleaning.

When the motor is energized by a user-actuable switch (not shown), attached shaft 40 is made to spin. This causes the drum to rotate about its longitudinal or center axis. In this manner, the drum will continue to turn without further action on the part of the operator.

The housing 6 includes sides 46, a top portion 48 an interior rear panel 50 and an exterior rear panel 52 that extends to also cover the rear portion of the base 2. The housing 6 is designed to surround the sides, top and rear of the drum. It should be noted that the breading tray 28 completely underlies the drum 4. When the drum is spinning, particles of breading will escape the drum through the apertures 36 and possibly also from the open front of the drum. The particles will fall either directly into the breading tray 28 or they will first hit the interior of the housing 6 and then fall into tray 28. By containing the drum as shown, the housing prevents breading particles from escaping from the unit as they are flung out of the sides and top of the drum due to the centrifugal force created by the rotation of the drum. The housing also helps to prevent airborne dust from landing on the drum and rear portion of the breading tray.

The drum's octagonal shape serves a number of functions. Each of the eight sides provides a flat area where the food product can easily contact a layer of the breading material. Most importantly, the flat areas allow a unique tumbling effect of the food product that is very similar to the manipulations that would be used if breading the product by hand. As the drum rotates at a relatively low speed (8-50 RPM), the chicken is caused to continually flip over and lay flat on each side of the drum that it contacts. This is similar to manually repeatedly flipping over the food product in a flat tray of breading material.

In operation, one first loads the drum with a quantity of breading material from tray 28 until a predetermined quantity of the breading material is within the drum. The user then takes one or more portions of the base food product, chicken pieces for example, and dips each piece into tray 24 containing the liquid batter which is normally in the form of an egg-based wash. One or more pieces of the batter-coated food product are then tossed into the drum and the drum is set into motion by motor 42. The food product piece(s) and breading material begin to tumble and within a short time, the food product is covered by an even layer of breading material. The drum is then stopped and the breaded food product is removed from the drum and placed into one of trays 16 or into a nearby tray or basket for cooking. Additional breading is then added to the drum and the process is repeated until all of the food products requiring breading have been similarly treated. It should be noted that the drum does not have to be stationary when the food products or breading materials are placed within or removed from the drum.

Whenever the breading material is within the drum and the drum is spinning, the breading is sifted by the drum apertures 36. The sifted material that passes through the apertures falls into the tray 28. This action not only saves the user from having to perform a separate sifting step, but also acts to pulverize the breading material and reduces the formation of doughballs.

FIG. 6 provides a perspective view of a second embodiment of the invention. The front portion of the unit 1' is not shown to thereby provide a clear view of the unit's interior. In this embodiment, a heater 60 is located below a number of storage trays 62 to maintain previously-cooked food products located in the trays in a warm condition. An insulated shelf 64 underlies the heater.

The breading tray 28' is located below the rotatable drum 4'. The batter wash tray 24' is located adjacent the front of the breading tray. The drum's fully horizontal orientation should be noted. In this manner, even though the breading material may continually spill from the drum as the food product is being breaded, the horizontal drum surfaces enhance the breading process.

Below the batter wash and breading trays is a refrigerated cabinet 70 having a number of cooling lines 72, 74. The cabinet includes three spaces 76 that are normally used to contain extra trays of food products, batter or breading in a cooled condition. The top-located cooling lines 72 function to keep the exposed breading tray 28' and batter wash tray 24' in a chilled condition.

FIGS. 7-9 show a third embodiment of the invention. As can be seen, the unit 1" is similar in basic design to the unit shown in FIGS. 1-5. The primary difference lies in the housing structure 80 that surrounds the drum 4".

As in the other embodiments, the rotatable drum 4" is preferably octagonal in shape with a plurality of apertures 36" located in the drum's sidewalls 32". The drum is releasably secured to a motor 42" via a shaft 40" and suitable fasteners 44". The drum is located above a breading material storage tray 28" and has an open front end.

Unlike the previously described embodiments, the housing 80 that surrounds the drum 4" is designed to rotate with the drum. The housing is itself drum-shaped and has a closed rear surface/end 82 and an open front end 84. The housing is preferably octagonal with eight sides 90. In the preferred orientation, the edges 86 between sidewalls 32" of the inner drum are located approximately at the midpoint of each of the housing's sides 90. In this manner, there is a space between the drum 4" and housing 80 in which breading material can be collected.

The housing is supported at its rear surface 82 via the shaft 40" of the motor 42". A rear fastener 92 on the shaft 40" is used to secure the housing to the drum. In this manner, the rear surfaces of both the housing and the drum are releasably locked together as they are sandwiched between the shaft-located fasteners 44" and 92. As a result, the drum and the housing rotate at the same time and at the same speed. Removal of fastener 44" allows the drum and housing to be removed from the unit.

Since both the housing and drum rotate, there is more weight that must be supported than in the embodiment shown in FIGS. 1-5. To support the combined structures, a front support system is preferably employed in addition to the rear support provided through the motor shaft 40".

The front support system makes use of a circular, 'C'-shaped channel 94 formed on the exterior surface of the front end of the housing. The channel's opening faces the rear of the unit and is preferably one to three inches in height. The channel is continuous about the entire periphery of the front end of the housing as shown in phantom in FIG. 8.

The channel is sized to inwardly contain a support roller 100 that is smaller in diameter than the channel opening. The roller is free to rotate about a shaft 102 that has a longitudinal axis parallel to the central axis of the housing 80 and drum 4". The roller shaft is secured to a bracket 104 that is hung from an overhanging member 48". The member is mounted to the base 2" via a vertically-oriented support member 106. It should be noted that the roller could alternatively be located below the housing and supported by a crossmember (not shown) that is secured to the base above the breading tray.

The operation of the third embodiment of the invention is similar to that of the other embodiments except that when the breading material is sifted by passing through the drum apertures 36", it does not fall back into the breading tray. Instead, it is captured within the plurality of areas 108 located between the exterior of drum 4" and the interior of the housing 80. It should be noted that a similar effect will result if alternatively, the spacing between the drum and housing is made larger or the surface geometries are changed to create a single, circular area 108 around the drum.

As the drum and housing rotate, different ones of areas 108 become positioned above drum 4". When this occurs, gravity causes the sifted material to fall back through the apertures into the drum 4". The returned material is then again brought into contact with the tumbling food product through the normal action of the unit.

By returning the material into the drum and not having it fall directly into the breading tray, two advantages are achieved. Firstly, a user prevents the material in the breading tray from being contaminated by the food product or by the batter dip. The second advantage is that by having the breading material automatically reenter the inner drum, a user does not have to refill the drum with breading material from the tray as frequently. This reduces the amount of manual labor required during the breading process.

It should be noted that a lid or cover, with internal connectors that secure the lid to one of the drums, could be used to close the opening in the front end of either one or both of the drums. This embodiment serves to positively retain the food product and/or material in the appropriate drum.

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

I claim:

1. A breader/sifter unit for breading food products, said unit comprising:
    a base;
    a housing located on top of the base, said housing having an interior area and a cylindrical sidewall;
    a drum located at least partially within said housing and operatively connected to the base by a rotatable securing means that allows the drum to be rotated about a central axis of said drum, said central axis of said drum being substantially horizontally-oriented, said drum having a cylindrical sidewall and an enclosed rear end, said drum sidewall having a plurality of apertures of a predetermined size that allows the drum to perform a sifting operation when it contains a quantity of breading means; and
    wherein the housing is drum-shaped and is rotatable with the drum whereby when any breading means passes through the apertures in the drum sidewall, the breading means enters the interior of the housing and can be rotated along with the housing.

2. The unit of claim 1 wherein the drum has an octagonal shape wherein the cylindrical sidewall is composed of eight sections.

3. The unit of claim 2 wherein the housing has an octagonal shape and its cylindrical sidewall is composed of eight sections.

4. The unit of claim 2 further comprising a motor means that is operatively connected to the drum wherein the motor means is capable of causing the drum to rotate.

5. The unit of claim 4 wherein the motor means is also operatively connected to the housing and is capable of causing the housing to rotate.

6. The unit of claim 1 wherein the base further comprises an interior area accessible from a front-located opening in the base, said interior area being capable of inwardly receiving a tray.

7. The unit of claim 1 wherein the apertures in the drum sidewall each have a diameter of approximately one-eigth inch.

8. The unit of claim 1 wherein the housing has an open front portion, a closed rear portion and has a length substantially equal to that of the drum.

9. The unit of claim 1 wherein the base includes refrigeration means for maintaining its interior area in a cold condition.

10. The unit of claim 1 further comprising a front support means that is operatively connected to the base and to a front portion of the housing whereby the front support means functions to at least partially support the front of the housing.

11. The unit of claim 10 wherein the front support means includes a roller operatively connected to the base by a bracket means and wherein the housing includes a channel that has an opening and an open interior area and wherein said channel is adapted to inwardly receive the roller within the interior area.

12. The unit of claim 11 wherein the channel is 'C'-shaped.

13. The unit of claim 11 wherein the bracket means is attached to a support member and wherein said support member is attached to the base and extends above the housing and wherein the bracket and roller are located above the housing.

14. A breader/sifter unit for breading food products, said unit comprising:
    a base;
    a first tray means for holding a particulate breading means, said first tray being located on a top portion of the base;
    a housing located on top of the base and operatively connected to the base by a rotatable securing means that allows the housing to be rotated about a central axis of said housing, said central axis of said housing being substantially horizontally-oriented, said housing having a cylindrical sidewall, an enclosed rear end and an interior area; and
    a drum located at least partially within said housing and operatively connected to the base by a rotatable securing means that allows the drum to be rotated about a central axis of said drum, said central axis of said drum being substantially horizontally-oriented, said drum having a cylindrical sidewall and an enclosed rear end, said drum sidewall having a plurality of apertures of a predetermined size that allows the drum to perform a sifting operation when it contains a quantity of breading means and whereby any breading means that passes through said apertures would be received within the interior area of the housing.

15. The unit of claim 14 wherein the drum has an octagonal shape wherein the cylindrical sidewall is composed of eight sections.

16. The unit of claim 14 wherein the apertures in the drum sidewall each have a diameter of approximately one-eigth inch.

17. The unit of claim 14 further comprising a front support means that is operatively connected to the base and to a front portion of the housing whereby the front support means functions to at least partially support the front of the housing.

18. The unit of claim 17 wherein the front support means includes a roller means operatively connected to the base by a bracket means and wherein the housing includes a channel that has an opening and an open interior area and wherein said channel is adapted to inwardly receive the roller means within the interior area.

19. The unit of claim 14 further comprising a motor means that is operatively connected to the drum and to the housing wherein the motor means is capable of causing the drum and housing to rotate.

* * * * *